(12) United States Patent
Lefebvre

(10) Patent No.: US 11,492,926 B2
(45) Date of Patent: Nov. 8, 2022

(54) BEARING HOUSING WITH SLIP JOINT

(71) Applicant: PRATT & WHITNEY CANADA CORP., Longueuil (CA)

(72) Inventor: Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/125,147

(22) Filed: Dec. 17, 2020

(65) Prior Publication Data

US 2022/0195889 A1 Jun. 23, 2022

(51) Int. Cl.
*F01D 25/16* (2006.01)
*F01D 25/30* (2006.01)
*F16C 27/04* (2006.01)

(52) U.S. Cl.
CPC ........... *F01D 25/164* (2013.01); *F01D 25/30* (2013.01); *F16C 27/04* (2013.01); *F05D 2240/54* (2013.01); *F16C 2360/23* (2013.01)

(58) Field of Classification Search
CPC ..... F01D 25/16–164; F01D 25/18–186; F16C 23/00; F16C 23/06; F16C 23/08; F16C 25/00–086; F16C 17/22; F16C 27/04
See application file for complete search history.

(56) References Cited

U.S. PATENT DOCUMENTS

| 4,304,522 A | 12/1981 | Newland |
| 5,415,478 A * | 5/1995 | Matthews ............. F01D 25/125 384/277 |
| 5,433,584 A | 7/1995 | Amin et al. |
| 5,603,602 A | 2/1997 | Romani |
| 5,974,782 A | 11/1999 | Gerez |
| 6,109,022 A | 8/2000 | Allen |
| 6,240,719 B1 | 6/2001 | Vondrell et al. |
| 6,428,269 B1 | 8/2002 | Boratgis et al. |
| 6,447,252 B1 | 9/2002 | Barker et al. |

(Continued)

FOREIGN PATENT DOCUMENTS

| CA | 3000360 A1 | 10/2018 | |
| DE | 19818634 A1 * | 11/1999 | ............. F16C 19/54 |

(Continued)

OTHER PUBLICATIONS

EPO Search Opinion in corresponding Application 21215567 dated May 9, 2022 (Year: 2022).*

(Continued)

*Primary Examiner* — Topaz L. Elliott
(74) *Attorney, Agent, or Firm* — Norton Rose Fulbright Canada LLP

(57) ABSTRACT

A bearing housing for a gas turbine engine has first and second housing members axially telescoped into each other at a slip joint. The first and second housing members extend circumferentially around a central axis for circumscribing a bearing cavity. The first housing member has a first bearing support for supporting a first bearing in the bearing cavity. The second housing member has a second bearing support for supporting a second bearing in the same bearing cavity. A seal is provided at the slip joint for sealing the bearing cavity.

17 Claims, 6 Drawing Sheets

(56) References Cited

U.S. PATENT DOCUMENTS

| | | |
|---|---|---|
| 6,494,032 B2 | 12/2002 | Udall et al. |
| 6,679,045 B2 | 1/2004 | Karafillis et al. |
| 6,786,642 B2 | 9/2004 | Dubreuil et al. |
| 6,846,158 B2 | 1/2005 | Hull |
| 7,100,358 B2 | 9/2006 | Gekht et al. |
| 7,195,444 B2 | 3/2007 | Brault et al. |
| 7,448,808 B2 | 11/2008 | Bouchy et al. |
| 7,452,152 B2 | 11/2008 | Bouchy et al. |
| 7,565,796 B2 | 7/2009 | Eleftheriou et al. |
| 7,793,488 B2 | 9/2010 | Eleftheriou et al. |
| 7,802,962 B2 | 9/2010 | Sjoqvist |
| 7,950,236 B2 | 5/2011 | Durocher et al. |
| 8,061,969 B2 | 11/2011 | Durocher et al. |
| 8,099,962 B2 | 1/2012 | Durocher et al. |
| 8,128,339 B2 | 3/2012 | Kondo et al. |
| 8,245,518 B2 | 8/2012 | Durocher et al. |
| 8,282,285 B2 | 10/2012 | Brillon |
| 8,337,090 B2 | 12/2012 | Herborth et al. |
| 8,534,076 B2 | 9/2013 | Woodcock et al. |
| 8,777,490 B2 | 7/2014 | Turbomeca et al. |
| 9,194,253 B2 | 11/2015 | Dijoud et al. |
| 9,447,817 B2 | 9/2016 | Gallimore et al. |
| 9,476,320 B2 | 10/2016 | Savela |
| 9,664,059 B2 | 5/2017 | Feldmann et al. |
| 9,702,404 B2 | 7/2017 | Smedresman et al. |
| 9,829,037 B2 | 11/2017 | Gallimore et al. |
| 9,909,451 B2 | 3/2018 | Carter et al. |
| 9,945,259 B2 | 4/2018 | Cigal et al. |
| 10,196,986 B2 | 2/2019 | Fang et al. |
| 10,267,176 B2 | 4/2019 | Otto et al. |
| 10,415,481 B2 | 9/2019 | Grogg et al. |
| 10,436,065 B2 | 10/2019 | DiBenedetto |
| 10,502,081 B2 | 12/2019 | Bioud et al. |
| 10,513,938 B2 | 12/2019 | Witlicki et al. |
| 10,519,804 B2 | 12/2019 | Van Den Berg |
| 10,519,863 B2 | 12/2019 | Roach et al. |
| 10,808,573 B1 | 10/2020 | Lefebvre et al. |
| 10,844,745 B2 | 11/2020 | Lefebvre et al. |
| 2003/0190099 A1* | 10/2003 | Alam .................. F16C 27/045 384/99 |
| 2005/0254945 A1 | 11/2005 | Duyn |
| 2008/0063333 A1 | 3/2008 | Bruno et al. |
| 2010/0242494 A1 | 9/2010 | Mulcaire |
| 2011/0123326 A1* | 5/2011 | DiBenedetto ............ F02K 3/06 384/563 |
| 2013/0051981 A1* | 2/2013 | Hindle .................... F01D 5/10 415/119 |
| 2017/0122369 A1* | 5/2017 | Smedresman ........ F16C 27/045 |
| 2017/0198604 A1 | 7/2017 | Lefebvre et al. |
| 2017/0234157 A1 | 8/2017 | Khan et al. |
| 2019/0195088 A1 | 6/2019 | Duffy et al. |
| 2019/0353051 A1 | 11/2019 | Ganiger et al. |
| 2020/0173557 A1* | 6/2020 | Fadgen ................ F16J 15/441 |
| 2020/0308982 A1* | 10/2020 | Lefebvre ................ F16C 19/54 |
| 2020/0309143 A1* | 10/2020 | Lefebvre ................ F16C 19/54 |

FOREIGN PATENT DOCUMENTS

| | | | |
|---|---|---|---|
| EP | 1489268 B1 | 12/2009 | |
| GB | 2459959 A * | 11/2009 | ............... B62D 1/16 |
| WO | WO-2008015777 A1 * | 2/2008 | ........... F01D 15/005 |
| WO | 2013/184429 A1 | 12/2013 | |

OTHER PUBLICATIONS

EPO Search Report in corresponding Application 21215567 dated May 9, 2022 (Year: 2022).*

European Search Report issued in counterpart application 21215567.5 dated May 9, 2022.

* cited by examiner

BEARING HOUSING WITH SLIP JOINT

TECHNICAL FIELD

The application relates generally to gas turbine engines and, more particularly, to bearing housings.

BACKGROUND

In a gas turbine engine, a rotary shaft holding compressor and turbine rotors is rotatably mounted within an engine casing via bearings. The bearings are enclosed in bearing housings. The bearing housings define bearing cavities for receiving lubricant for lubricating the bearings. Due to the forces inherent to gas turbine engine operation, and as they are the interface between shafts and a support structure, the bearings are exposed to loads, vibrations, etc. that may affect their performance over time.

SUMMARY

In one aspect, there is provided a bearing assembly for a gas turbine engine, the bearing assembly comprising: a first bearing and a second bearing axially spaced apart from one another along an axis of the gas turbine engine; and a bearing housing extending circumferentially around the axis and defining a bearing cavity, the first bearing and the second bearing supported by the bearing housing in the bearing cavity, the bearing housing having first and second housing members with an axial overlap at a slip joint, the bearing cavity sealed at said slip joint by an annular seal carried by one of the first and second housing members for sealing engagement with a corresponding circumferentially extending sealing surface on another one of the first and second housing members.

In another aspect, there is provided a bearing housing for a gas turbine engine having an axis, the bearing housing comprising: first and second housing members axially telescoped into each other at a slip joint, the first and second housing members extending circumferentially around the axis for circumscribing a bearing cavity, the first housing member having a first bearing support in said bearing cavity, the second housing member having a second bearing support in said bearing cavity; and a seal at said slip joint for sealing the bearing cavity.

In a further aspect, there is provided a gas turbine engine comprising: an exhaust case having a central axis, the exhaust case having a first and a second mounting structure spaced-apart along the central axis; a rotating shaft extending axially into the exhaust case; a first and a second bearing axially spaced-apart along the central axis for rotatably supporting the rotating shaft in the exhaust case; a bearing housing extending circumferentially around the rotating shaft, the bearing housing defining a bearing cavity, the first and second bearing contained in the bearing cavity, the bearing housing including a first housing member having a first bearing support supporting the first bearing, and a second housing member having a second bearing support supporting the second bearing, the first bearing support having a first connecting member secured to the first mounting structure of the exhaust case, the second bearing support having a second connecting member secured to the second mounting structure of the exhaust case; a slip joint between the first and second housing members at an axial location intermediate the first and second bearing supports, the slip joint allowing relative axial movement of the first housing member relative to the second housing member is response to a thermal expansion of the exhaust case; and a seal sealing the bearing cavity at the slip joint.

DESCRIPTION OF THE DRAWINGS

Reference is now made to the accompanying figures in which.

DETAILED DESCRIPTION

Figure 1:
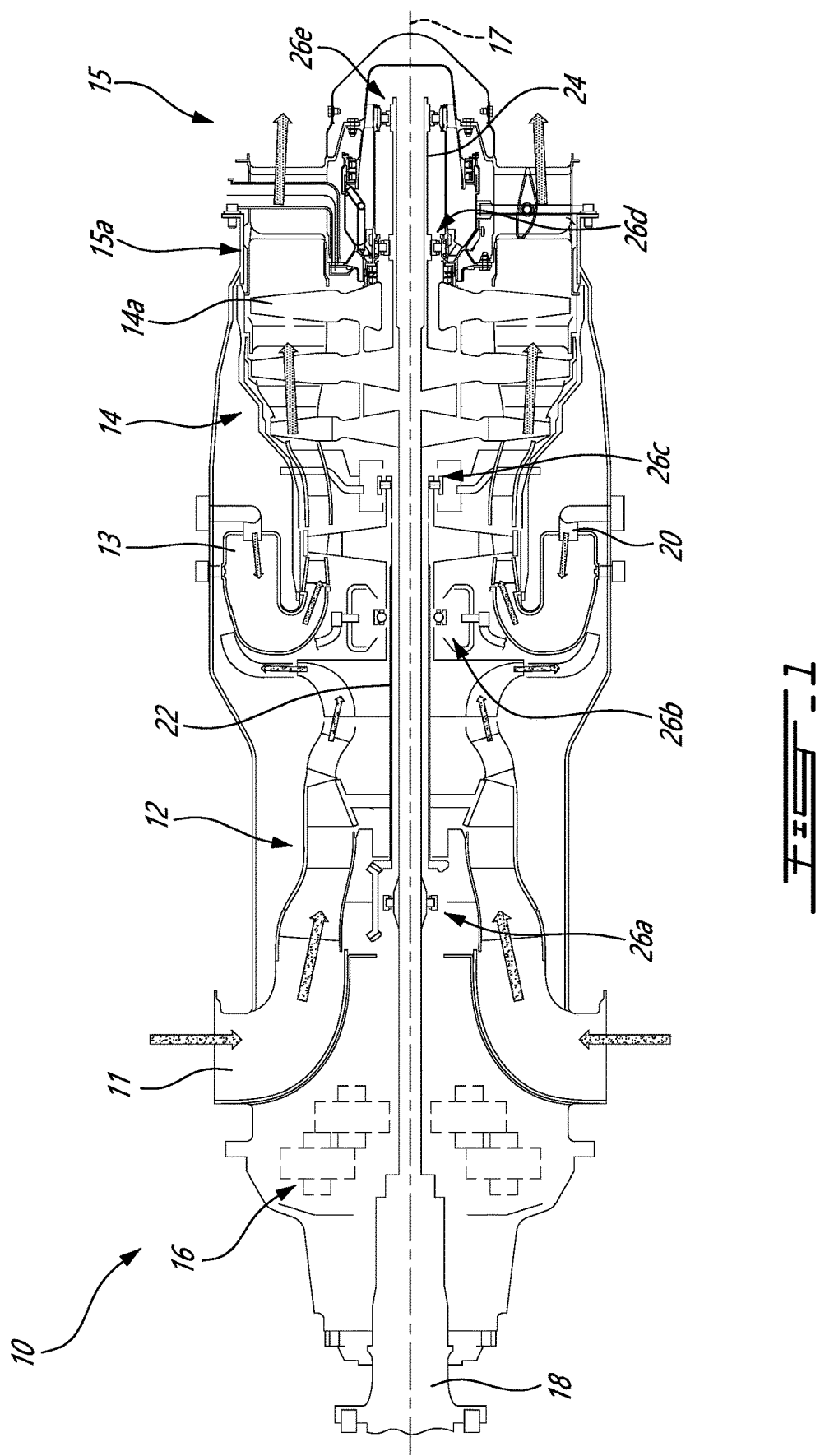
FIG. 1 is a schematic cross-section view of a gas turbine engine.

FIG. 1 illustrates a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. The turbine 14 includes a low pressure or power turbine 14a drivingly connected to an input end of a reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17.

The gas turbine engine 10 has an axially extending central core which defines an annular gaspath 20 through which gases flow, as depicted by flow arrows in FIG. 1. It is understood that the engine could adopt different configurations, the engine configuration illustrated in FIG. 1 being provided for context purposes only. For instance, the engine could be configured as a turboprop, a turboshaft, a turbofan or an auxiliary power unit (APU) in a through flow or reverse flow arrangement.

The compressor 12 and turbine 14 have rotating components mounted on one or more shafts 22, 24, which, in the illustrated embodiment, rotate concentrically around the central axis 17. A plurality of bearings 26a, 26b, 26c, 26d and 26e are provided along the axis 17 to support the rotating shafts 22, 24.

Figure 2:
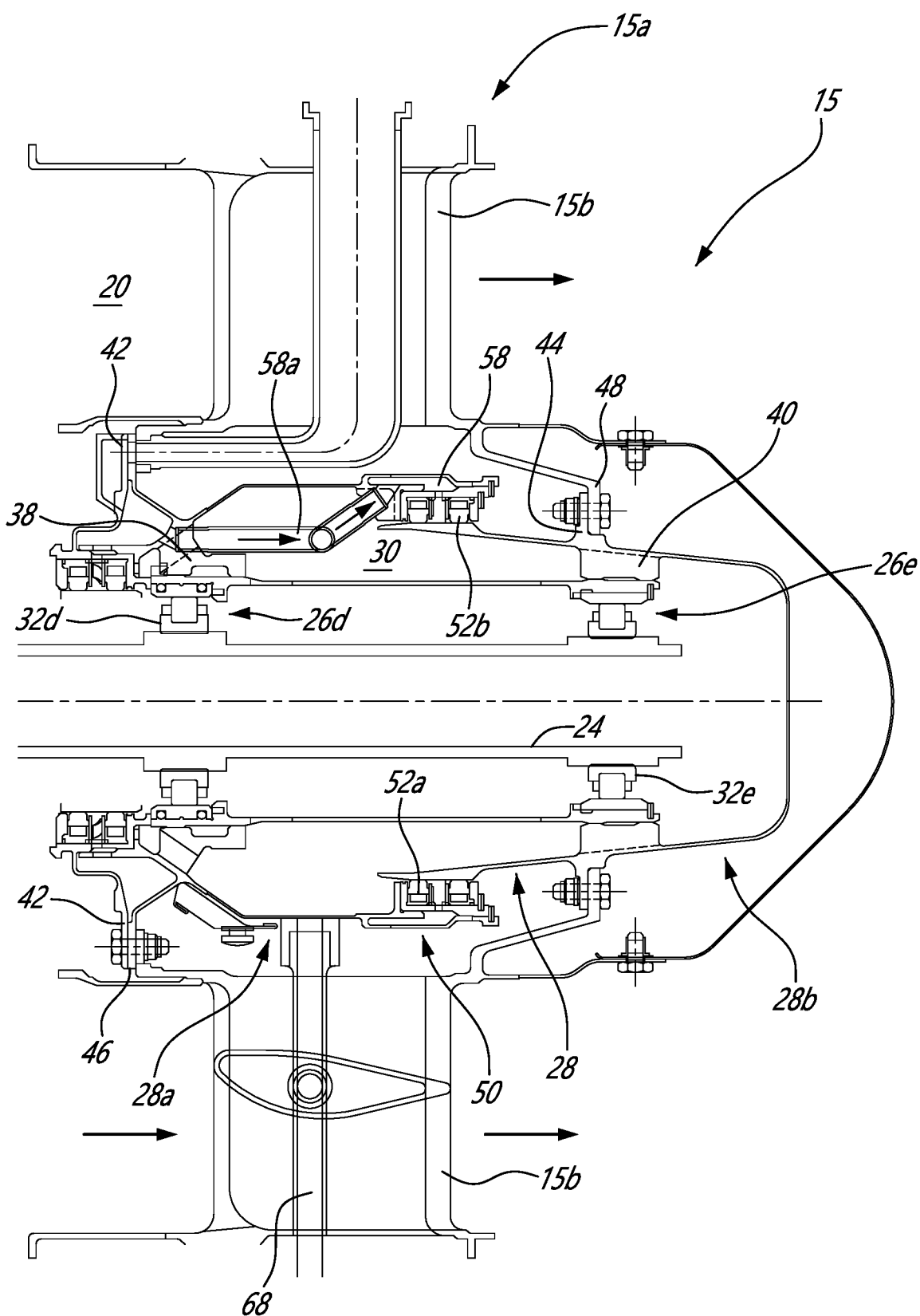
FIG. 2 is a cross-section view of a bearing assembly including a dual bearing arrangement contained in a single bearing housing having two connections to an engine casing and a slip joint acting as an expansion joint to allow for differential thermal displacement between the bearing supports.
Figure 3:
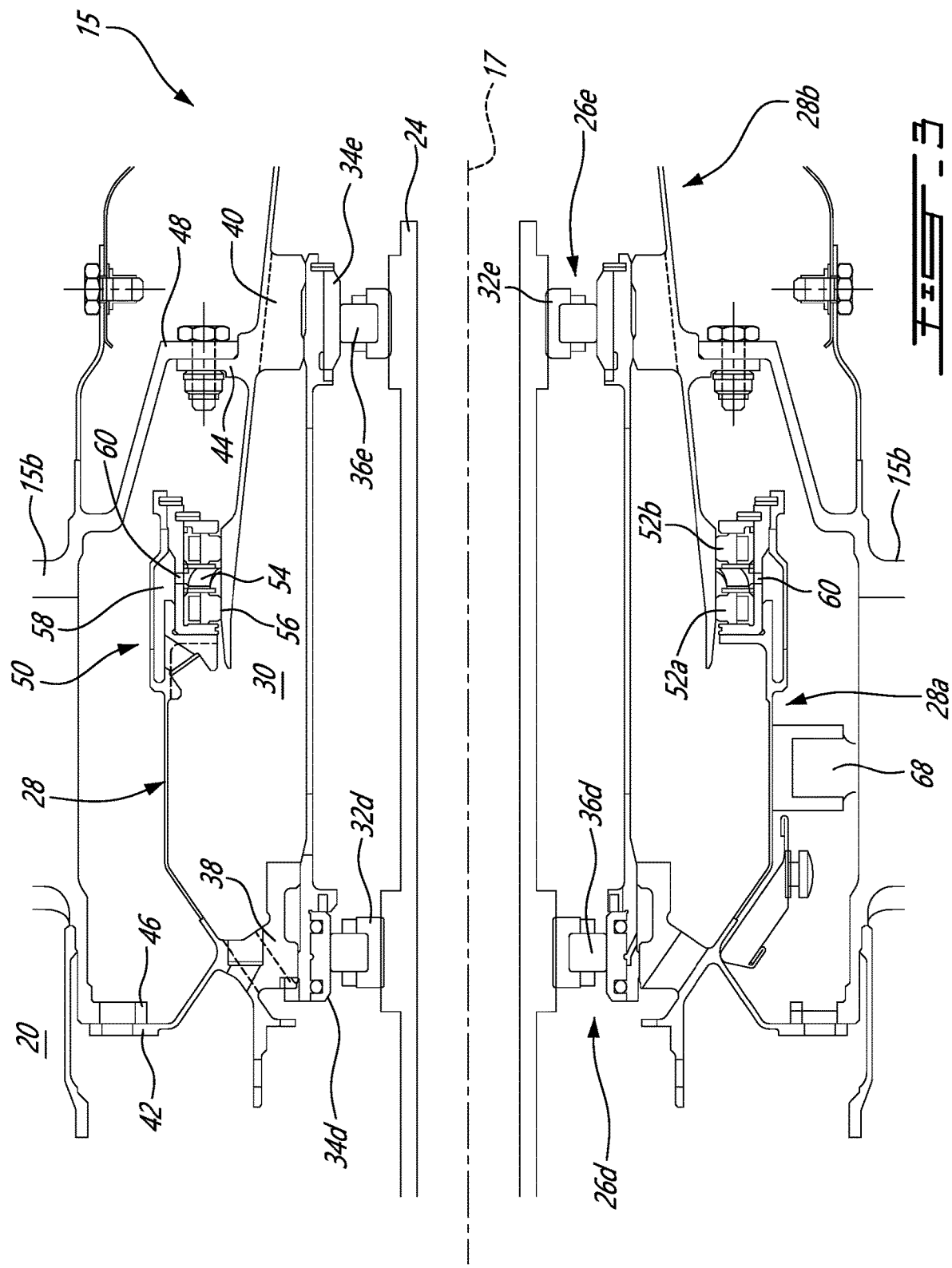
FIG. 3 is an enlarged view of the cross-section shown in FIG. 2 with some details omitted to better illustrate an embodiment of the slip joint including a static seal embodied in the form of a carbon seal having two static carbon seal elements.

FIGS. 2 and 3 show a cross-section of a portion of the engine exhaust 15. The exhaust 15 has an exhaust casing 15a including a number of circumferentially spaced-apart hollow structural struts 15b extending radially across the hot gas path 20. The exhaust 15 further comprises a bearing assembly including a single bearing housing 28 supporting both bearings 26d and 26e in a common bearing cavity 30 fluidly connected to a source of lubricant (not shown). As will be seen hereinafter, the bearing housing 28 enclosing bearings 26d and 26e can have a fore and a aft structural connection to the exhaust casing 15a for respectively transferring loads from the fore and aft bearings 26d, 26e to the exhaust casing 15a. The provision of two structural connections or load transfer paths between the bearing housing 28 and the exhaust casing 15a allows to individually adjust/tune the stiffness response at the fore and aft bearing 26d, 26e even though they are both mounted to the same bearing housing 28.

Still referring to FIGS. 2 and 3, each bearing 26d, 26e has an inner race 32d, 32e secured to the shaft 24, an outer race 34d, 34e secured to the bearing housing 28 and rolling elements 36d, 36e located radially between the inner and outer races 32d, 32e; 34d, 34e. The rolling elements 36d, 36e may be spherically, cylindrically, frustoconically shaped, among other. It is understood that any suitable type of bearings may be used depending on the intended application.

The bearing housing 28 extends circumferentially all around the central axis 17 radially inwardly of a hot section of the gas path 20 and has fore and aft closed ends to fully enclose the above described bearings 26d and 26e in the same bearing cavity 30. The bearing housing 28 has a first built-in bearing support 38 at a fore end thereof for supporting bearing 26d and a second built-in bearing support 40 at an aft end thereof for supporting bearing 26e. Each of the two bearing supports 38, 40 includes a sturdy ring of forged material defining a seat for receiving a respective one of the outer races 34d, 34e of the bearings 26d, 26e. The two bearing supports 38, 40 are thicker and stiffer than the skin of the bearing housing 28 so as to withstand the loads transferred thereto from the rotating shaft 24 via the bearings 26d, 26e. As best shown in FIG. 3, each of the bearing supports 38, 40 has a connecting member 42, 44 detachably securable to a corresponding mounting structure 46, 48 of the exhaust casing 15a. According to one embodiment, the connecting members 42, 44 and the exhaust case mounting structures 46, 48 include mating annular flanges having a circumferential array of holes for receiving fasteners, such as bolts. For instance, the first and second connecting members 42, 44 can include annular flanges projecting radially outwardly from the first and second bearing supports 38, 40 respectively. Likewise, the exhaust case mounting structures 46, 48 can be provided in the form of annular flanges projecting radially inwardly from an inner surface of the exhaust casing 15a. According to the illustrated embodiment, the first exhaust case mounting structure 46 is disposed at a fore end of the exhaust case 15a upstream of the structural struts 15b, whereas the second mounting structure 48 is disposed just downstream of the structural struts 15b relative to a flow of combustion gases through the gas path 20.

As mentioned above, in some cases, it might be advantageous to vary the stiffness of the two bearing supports 38, 40 of the bearing housing 28. However, increasing the stiffness of one of the two bearing supports 38, 40 may indirectly increase that of the other. Moreover, if the two bearing supports 38, 40 of the bearing housing 28 vary in their respective stiffness, they might react differently to temperature variation. In other words, when the bearing housing 28 is installed in a hot section of the engine, such as in the turbine or exhaust section of the engine, one of the two bearing supports 38, 40 may be subjected to different thermal expansion than the other. This may result in thermal stresses in the bearing housing 28. This phenomenon may be enhanced by the high temperature gradients in the exhaust 15. Also, during engine operation, the exhaust case 15a thermally expands in the radial and axial directions. Since, the bearing housing 28 has a fore and an aft connection to the exhaust casing 15a, the bearing housing 28 has to accommodate such thermal displacement between its two points of attachment/connection to the exhaust casing 15a. To that end, the bearing housing 28 can be split into a fore and an aft section with a seal at the interface between the two housing sections. For instance, referring to FIG. 3, it can be seen that the bearing housing 28 may comprises a first housing member 28a and a second housing member 28b. The first bearing support 38 and the first connecting member 42 are integral parts of the first housing member 28a. The second bearing support 40 and the second connecting member 44 are integral parts of the second housing member 28b. The first and second housing members 28a, 28b have an axial overlap at an intermediate location between the first and second bearing supports 38, 40. According to the illustrated embodiment, the second housing member 28b has an annular fore end portion telescopically inserted in a mating aft end portion of the first housing member 28a so as define a slip joint 50. The slip joint 50 acts as an expansion joint to allow relative axial movement between the first and second housing members 28a, 28b. This allows accommodating the thermal expansion of the exhaust casing 15a during engine operation.

Figure 4:
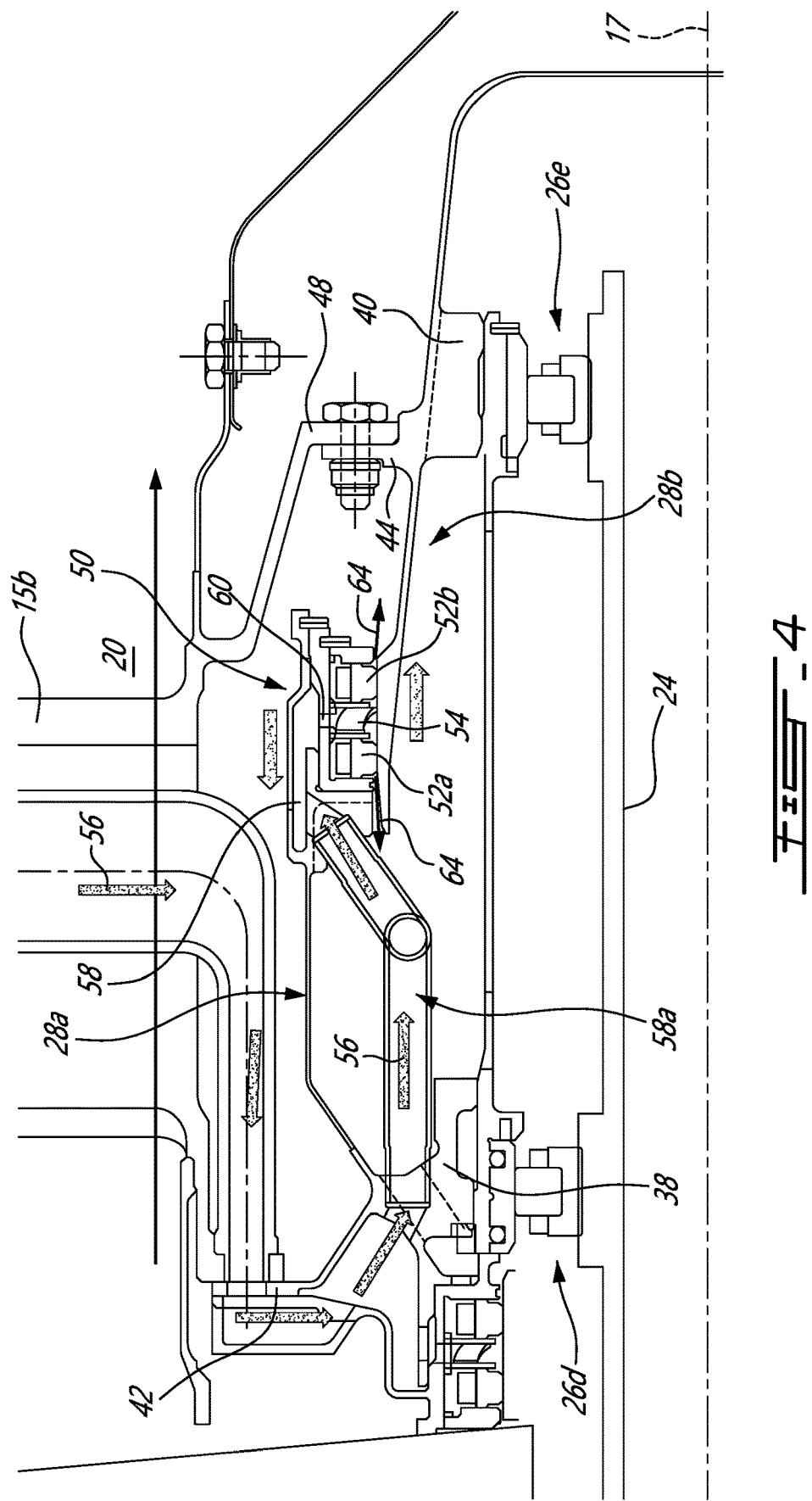
FIG. 4 is an enlarged cross-section illustrating an upper half of the bearing housing and slip joint with the dual carbon seal fluidly connected to a pressurized air supply to aid in sealing the bearing cavity.
Figure 5:
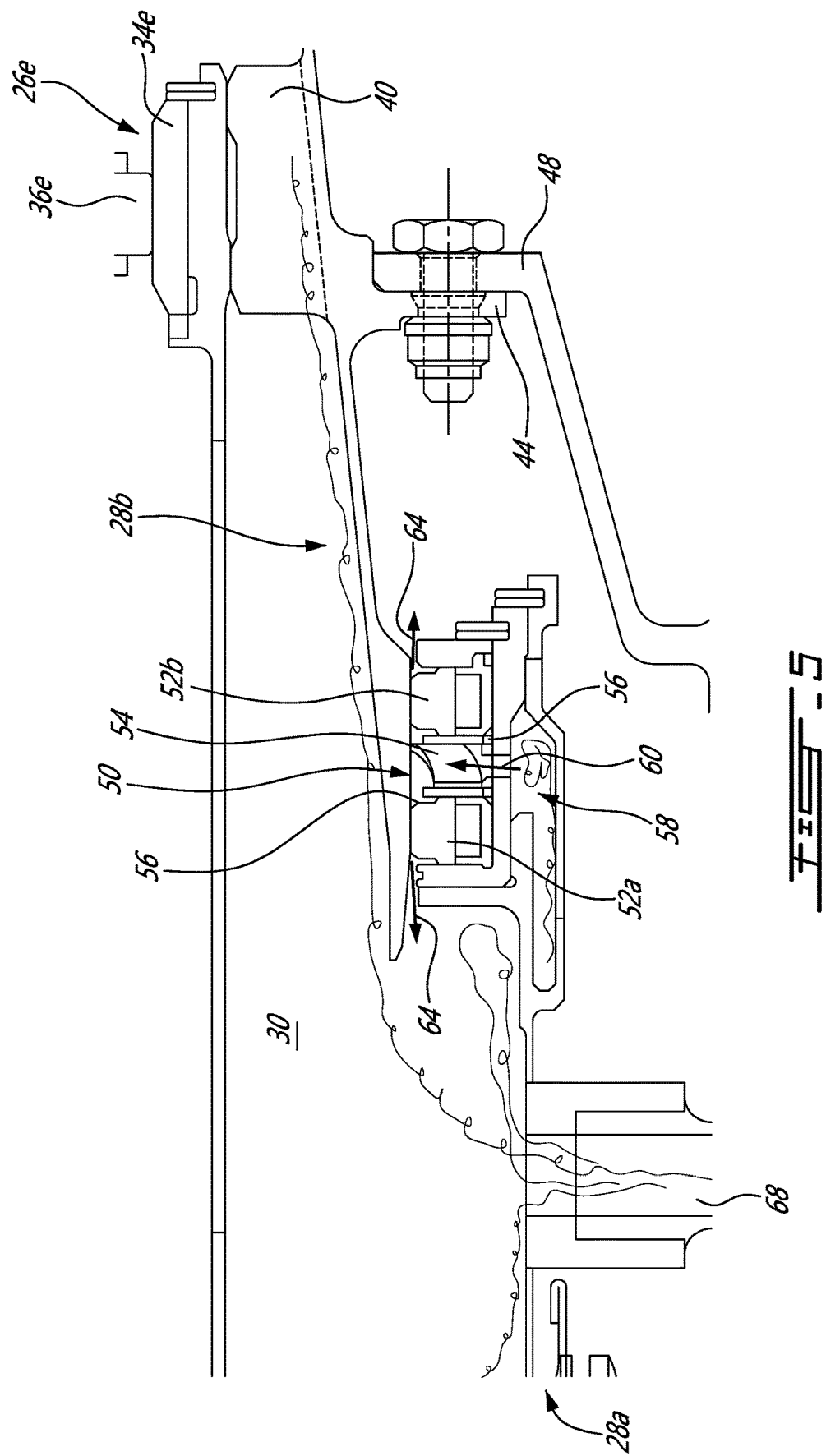
FIG. 5 is an enlarged cross-section illustrating a lower half of the bearing housing and slip joint with the air pressurized dual carbon seal.

As shown in FIGS. 3-5, a static seal is provided at the slip joint 50 to seal the bearing cavity 30. According to some embodiments, the seal comprises a carbon seal including two annular carbon seal elements 52a, 52b disposed adjacent to each other and axially separated by a gap 54, the gap 54 fluidly connected to a source of buffer air to aid in sealing the joint between the first and second housing members 28a, 28b. According to the illustrated embodiment, the carbon seal is carried by the first housing member 28a for sealing engagement with a static outer diameter sealing surface 56 of the second housing member 28b. However, it is understood that the carbon seal could be mounted to the outer diameter surface of the second housing member 28b for sealing engagement with an inner diameter surface of the first housing member 28a.

As shown by flow arrows 56 in FIG. 4, an air feed circuit extends through one or more of the structural struts 15b for directing pressurized air into an annular air distribution plenum 58 defined in the aft end of first housing member 28a around the carbon seal. The air circuit may comprise a number of air pipes 58a mounted to the first housing member 28a. The gap 54 between the first and second carbon seal elements 52a, 52b is fluidly connected to the plenum 58 at the aft end of the first housing member 28a by one or more inlet holes 60 of the carbon seal. The one or more inlet holes 60 may include a series of circumferentially distributed inlet holes.

The carbon seal elements may be disposed closely (yet not abutting) to the radially outer sealing surface 56 of the second housing member 28b so as to provide a gap seal. Accordingly, the expression "sealingly engaging" should be herein broadly construed to encompass such a variant. In normal operation conditions, pressurised air in the gap 54 between the carbon seal elements 52a, 52b escapes through a space defined between the carbon seal elements 52a, 52b and the outer diameter sealing surface 56 of the second housing member 28b (see arrows 64 in FIGS. 4 and 5). Some of the air escapes toward the bearing cavity 30 of the bearing housing 28, while some toward a chamber surrounding the bearing housing 28. The air being forced into the gap between the carbon seal elements 52a, 52b creates a static pressure which prevents lubricant (e.g. oil) to leak from the bearing cavity 30 through the slip joint 50 between the first and second housing members 28a, 28b.

As shown in FIG. 5, lubricant can be scavenged from the bearing cavity 30 via a scavenge pipe 68 provided at the bottom of the cavity 30. The scavenge pipe 68 may extend radially through one of the structural struts 15b. According to some embodiments, the scavenge pipe 68 is connected to the first housing member 28a. The housing members 28a and 28b are designed to avoid oil pooling at all engine attitude. In that regard, the inner surface of the housing members 28a, 28b may define slopes extending downwardly towards the scavenge pipe 68 to allow the lubricant to flow in a waterfall fashion towards the scavenge pipe as illustrated in FIG. 5.

Figure 6:
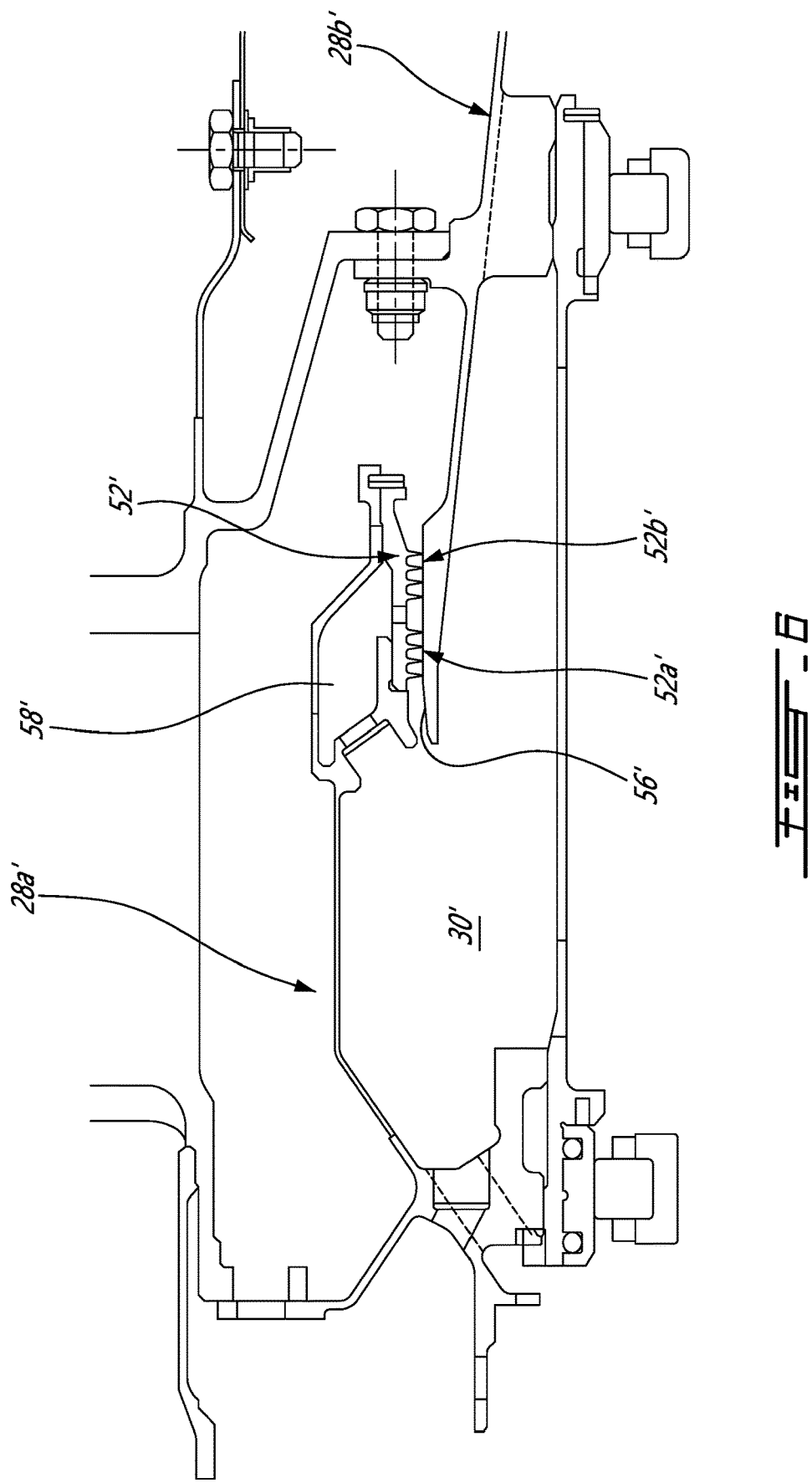
FIG. 6 is an enlarged cross-section illustrating an upper half of an annular slip joint having a static seal embodied in the form of a labyrinth seal.

FIG. 6 illustrates another embodiment which differs from the embodiment of FIGS. 2-5 in that the seal at the slip joint 50' is provided in the form of a labyrinth seal 52'. The labyrinth seal 52' can be removably mounted to the aft end portion of the first housing member 28a radially inwardly of the annular pressurized air plenum 58' for sealing engagement with the outer diameter sealing surface 56' of the second housing member 28b'. According to the illustrated example, the labyrinth seal 52' include a first series of axially distributed annular teeth 52a' and a second series of axially distributed annular teeth 52b'. The first and second series are spaced by a gap 54' fluidly connected to the plenum 58'.

In operation, the slip joint 50 allows the first and second housing members 28a, 28b; 28' 28b' to move axially relative to one another to cater for the thermal expansion of the exhaust case 15. The seal 52, 52' at the slip joint 50, 50' seal the bearing cavity 30, 30'. According to at least some embodiments, this allows for multiple rigid bearing support connections from a hot turbine/exhaust case to a bearing housing containing multiple bearings (two or more) to cater for differential thermal displacement of each individual bearing support within a single bearing housing. This may allow for a dual bearing support structure with no axial connection such that the stiffness of each bearing support can be individually adjusted without affecting the other bearing supports within the common bearing housing, thereby providing the designer with more flexibility to better meet the various shaft dynamic requirements of a gas turbine engine.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the bearing housing has been described with two bearing supports and two casing connections, it is understood than more than two bearing supports and casing connections could be provided. A slip or a sliding joint could be provided between each bearing supports and casing connections. Yet further modifications could be implemented by a person of ordinary skill in the art in view of the present disclosure, which modifications would be within the scope of the present technology.

The invention claimed is:

1. A bearing assembly for a gas turbine engine, the bearing assembly comprising:
    a first bearing and a second bearing axially spaced apart from one another along an axis of the gas turbine engine; and
    a bearing housing extending circumferentially around the axis and defining a bearing cavity, the first bearing and the second bearing supported by the bearing housing in the bearing cavity, the bearing housing having first and second housing members with an axial overlap at a slip joint, the bearing cavity sealed at said slip joint by an annular seal carried by one of the first and second housing members for sealing engagement with a corresponding circumferentially extending sealing surface on the other of the first and second housing members; wherein the first housing member has a first bearing support supporting the first bearing in the bearing cavity, and the second housing member has a second bearing support supporting the second bearing in the bearing cavity, and wherein the first housing member and the second housing member are independently securable to a casing of the gas turbine engine.

2. The bearing assembly defined in claim 1, wherein the first housing member has a first connecting member extending radially outwardly from the first bearing support, the second housing member has a second connecting member extending radially outwardly from the second bearing support, the first and second connecting members securable to respective axially spaced apart mounting structures of the casing of the gas turbine engine.

3. The bearing assembly defined in claim 2, wherein the annular seal includes a carbon seal or a labyrinth seal disposed axially between the first and second bearing supports.

4. The bearing assembly defined in claim 2, wherein the annular seal is a carbon seal provided on an inner diameter of the first housing member, and wherein the corresponding circumferentially extending sealing surface is provided on an outer diameter of the second housing member.

5. The bearing assembly defined in claim 2, wherein the annular seal is a dual element carbon seal including two carbon seal elements disposed adjacent to each other and axially separated by a pressurized gap, the pressurized gap fluidly connected to a source of pressurized air.

6. The bearing assembly defined in claim 5, wherein the pressurized gap is fluidly connected to an annular plenum, the annular plenum circumferentially circumscribed by an inner diameter of the first housing member at the slip joint.

7. A bearing housing for a gas turbine engine having an axis, the bearing housing comprising:
    first and second housing members axially telescoped into each other at a slip joint, the first and second housing members extending circumferentially around the axis for circumscribing a bearing cavity, the first housing member having a first bearing support in said bearing cavity, the second housing member having a second bearing support in said bearing cavity; and
    a seal at said slip joint for sealing the bearing cavity, wherein the seal includes a carbon seal or a labyrinth seal disposed axially between the first and second bearing supports.

8. The bearing housing defined in claim 7, wherein the first housing member has a first connecting member extending radially outwardly from the first bearing support, the second housing member having a second connecting member extending radially outwardly from the second bearing support.

9. The bearing housing defined in claim 7, wherein the seal is the carbon seal, the carbon seal provided on an inner diameter of the first housing member, and wherein the corresponding circumferentially extending sealing surface is provided on an outer diameter of the second housing member.

10. The bearing housing defined in claim 9, wherein the carbon seal includes two carbon seal elements axially separated by a pressurized gap, the pressurized gap fluidly connected to a source of pressurized air.

11. The bearing housing defined in claim 10, wherein the pressurized gap is fluidly connected to an annular plenum, the annular plenum circumferentially circumscribed by an inner diameter of the first housing member at the slip joint.

12. A gas turbine engine comprising:
an exhaust case having a central axis, the exhaust case having a first and a second mounting structure spaced-apart along the central axis;
a rotating shaft extending axially into the exhaust case;
a first and a second bearing axially spaced-apart along the central axis for rotatably supporting the rotating shaft in the exhaust case;
a bearing housing extending circumferentially around the rotating shaft, the bearing housing defining a bearing cavity, the first and second bearings contained in the bearing cavity, the bearing housing including a first housing member having a first bearing support supporting the first bearing, and a second housing member having a second bearing support supporting the second bearing, the first bearing support having a first connecting member secured to the first mounting structure of the exhaust case, the second bearing support having a second connecting member secured to the second mounting structure of the exhaust case;
a slip joint between the first and second housing members at an axial location intermediate the first and second bearing supports, the slip joint allowing relative axial movement of the first housing member relative to the second housing member response to a thermal expansion of the exhaust case; and
a seal sealing the bearing cavity at the slip joint.

13. The gas turbine engine defined in claim 12, wherein the first and second housing members are engaged in an axially telescoping fashion at the slip joint.

14. The gas turbine engine defined in claim 13, wherein the seal is removably installed to an inner diameter of first housing member for sealing engagement with an outer diameter of the second housing member.

15. The gas turbine engine defined in claim 13, wherein the seal includes a carbon seal or a labyrinth seal removably mounted to one of the first and second housing members.

16. The gas turbine engine defined in claim 12, wherein the seal includes first and second seal elements axially spaced-apart by a gap fluidly connected to a pressurized air plenum circumferentially circumscribed by an inner diameter of the first housing member.

17. The gas turbine engine defined in claim 12, wherein the exhaust case comprises an array of circumferentially distributed struts extending radially across a gas path, wherein the first and second mounting structures are respectively disposed upstream and downstream of the array of circumferentially distributed struts.

* * * * *